United States Patent [19]

Komine et al.

[11] Patent Number: 4,912,771

[45] Date of Patent: Mar. 27, 1990

[54] IMAGE MEMORY APPARATUS

[75] Inventors: Takayuki Komine, Kawasaki; Tsuguhide Sakata, Machida, both of Japan

[73] Assignee: Canon Kabushiki Kaisha, Tokyo, Japan

[21] Appl. No.: 81,850

[22] Filed: Aug. 5, 1987

[30] Foreign Application Priority Data

Aug. 13, 1986 [JP] Japan .................................. 61-190043

[51] Int. Cl.⁴ .............................................. G06K 9/32
[52] U.S. Cl. .................................................... 382/46
[58] Field of Search ...................... 382/46, 44; 360/22, 360/23

[56] References Cited

U.S. PATENT DOCUMENTS 4,562,485 12/1985 Maeshima ........................... 358/280
4,790,025 12/1988 Inoue et al. ........................... 382/41

Primary Examiner—Theodore M. Blum
Attorney, Agent, or Firm—Fitzpatrick, Cella, Harper & Scinto

[57] ABSTRACT

An image memory apparatus comprising a first and a second memory and having a dual port function. It includes a first control device which controls the access to the respective memories in accordance with a set of X and Y addresses of image information and a second control device which accesses that one of the first and second memories which is not accessed by the first control device.

13 Claims, 9 Drawing Sheets

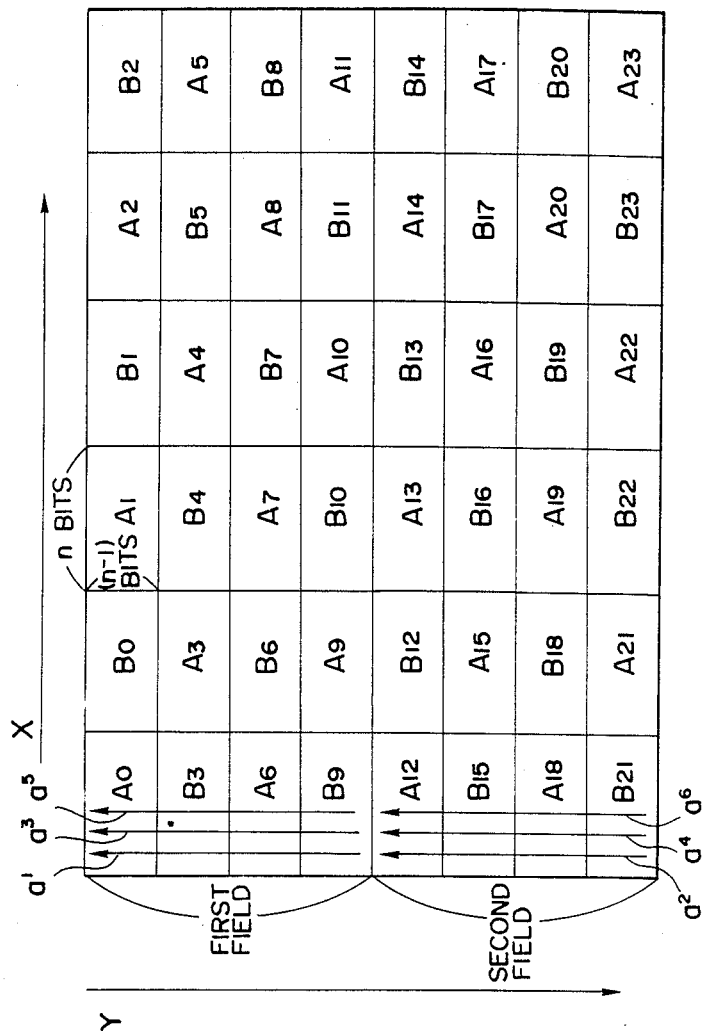

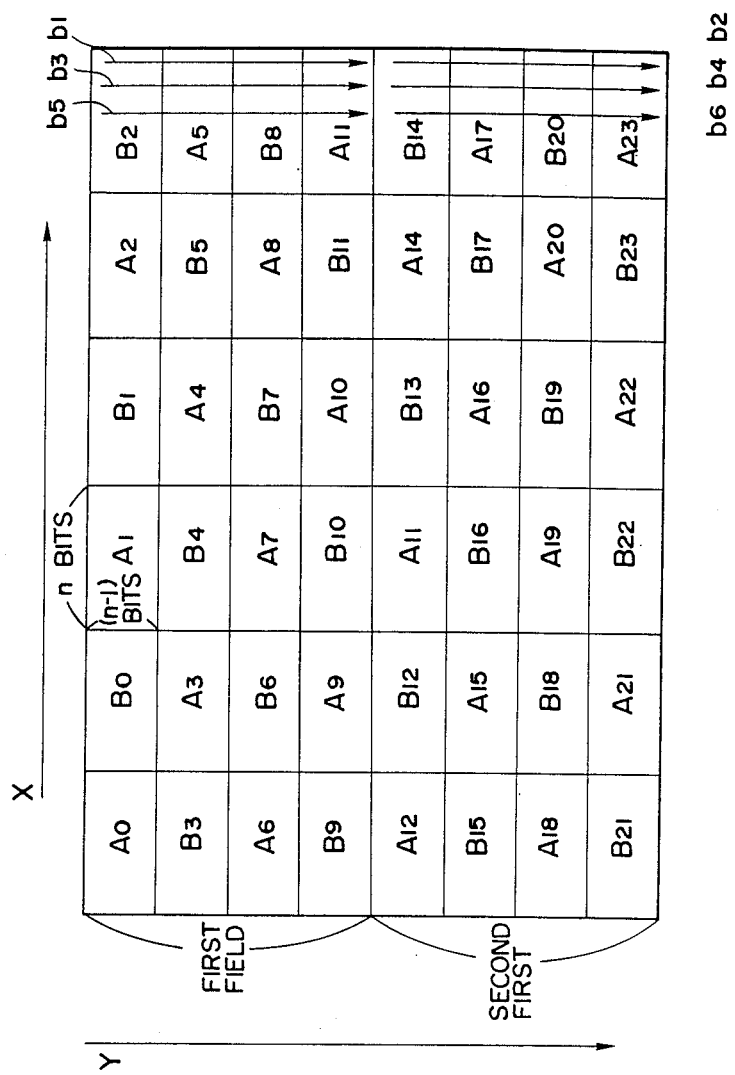

FIG. 10

| COUNTER | LENGTH-WIDTH 2 |
|---|---|
| $C_0$ | $Y_0$ |
| $C_1$ | $Y_1$ |
| $C_2$ | $Y_2$ |
| $C_3$ | $Y_3$ |
| $C_4$ | $Y_4$ |
| $C_5$ | $Y_5$ |
| $C_6$ | $Y_6$ |
| $C_7$ | $Y_7$ |
| $C_8$ | — |
| $C_9$ | — |
| $C_{10}$ | $X_2$ |
| $C_{11}$ | $X_3$ |
| $C_{12}$ | $X_4$ |
| $C_{13}$ | $X_5$ |
| $C_{14}$ | $X_6$ |
| $C_{15}$ | $X_7$ |
| $C_{16}$ | $X_8$ |
| $C_{17}$ | $X_9$ |
| $C_{18}$ | $X_1$ |

FIG. 9

| | | | | | |
|---|---|---|---|---|---|
| $A_0$ | $B_0$ | n BITS $A_1$ | $B_1$ | $A_2$ | $B_2$ |
| $B_3$ | $A_3$ | $B_4$ | $A_4$ | $B_5$ | $A_5$ |
| $A_6$ | $B_6$ | $A_7$ | $B_7$ | $A_8$ | $B_8$ |
| $B_9$ | $A_9$ | $B_{10}$ | $A_{10}$ | $B_{11}$ | $A_{11}$ | n BITS

FIRST FIELD

SECOND FIELD

IMAGE MEMORY APPARATUS

BACKGROUND OF THE INVENTION

1. Field of the Invention

This invention relates to an image memory apparatus and more particularly to an image memory apparatus in which, for example, the length and width of a picture can be exchanged with each other.

2. Related Background Art

Conventionally, an image memory apparatus is known which has a so-called dual port function of writing and reading image information as well as rewriting image data from an external circuit.

In the conventional memory apparatus, however, the sequence of writing addresses and the sequence of reading addresses are predetermined, so that when reading is performed in a sequence different from that of writing as in the case where the length and breadth of a picture are changed, writing and reading of image information from an external circuit can be impossible.

SUMMARY OF THE INVENTION

It is therefore a first object of this invention to provide an image memory apparatus which solves such prior art problems and has a dual port function, although reading is performed in a sequence different from that of writing.

It is a second object of this invention to provide an image memory apparatus which has a dual port function, for example, when the length and/or width of a picture are changed.

In order to achieve the above objects, according to a preferred embodiment of this invention, there is disclosed an image memory apparatus which accesses two system memories alternately at predetermined clock beats so that a first memory of the apparatus is accessed when $(Xm, Yn) = (0, 0)$, a second memory of the apparatus is accessed when $(Xm, Yn) = (1, 0)$, the second memory is accessed when $(Xm, Yn) = (0, 1)$ and the first memory is accessed when $(Xm, Yn) = (1, 1)$ where Xm and Yn are the $m^{th}$ and $n^{th}$ bits of X and Y addresses, respectively, of image information.

It is a third object of this invention to provide an image memory apparatus in which no part of an image is lost when an image is rotated as when the length and/or width of the picture are changed.

It is a fourth object of this invention to provide an image memory apparatus which maintains the position of an image easy to watch on a monitor when the image is rotated, for example, when the length and/or width of the image are changed.

Under these objects, according to a preferred embodiment of this invention, an image memory apparatus is disclosed in which the image written into a memory is centered onto a monitor when the image is read so that it is rotated relative to the original image.

Other objects and features of this invention will be apparent from the following description of an embodiment thereof when taken in conjunction with the accompany drawings.

BRIEF DESCRIPTION OF THE DRAWINGS

FIG. 5 illustrates the operation of an address generating circuit 33 shown in FIG. 4;

FIGS. 6 and 7 illustrate the sequences of reading signals from a memory by changing the length and/or breadth of a picture;

FIG. 9 is a diagram of an allocation of two system memories A and B to prevent an image from being partially lost, by thinning out pixels when the length and/or width of the picture are changed;

FIG. 10 illustrates the operation of the address generating circuit 33 when the memories shown in FIG. 9 are used.

DETAILED DESCRIPTION OF THE PREFERRED EMBODIMENTS

This invention will now be described in more detail with reference to the drawings.

Figure 1:
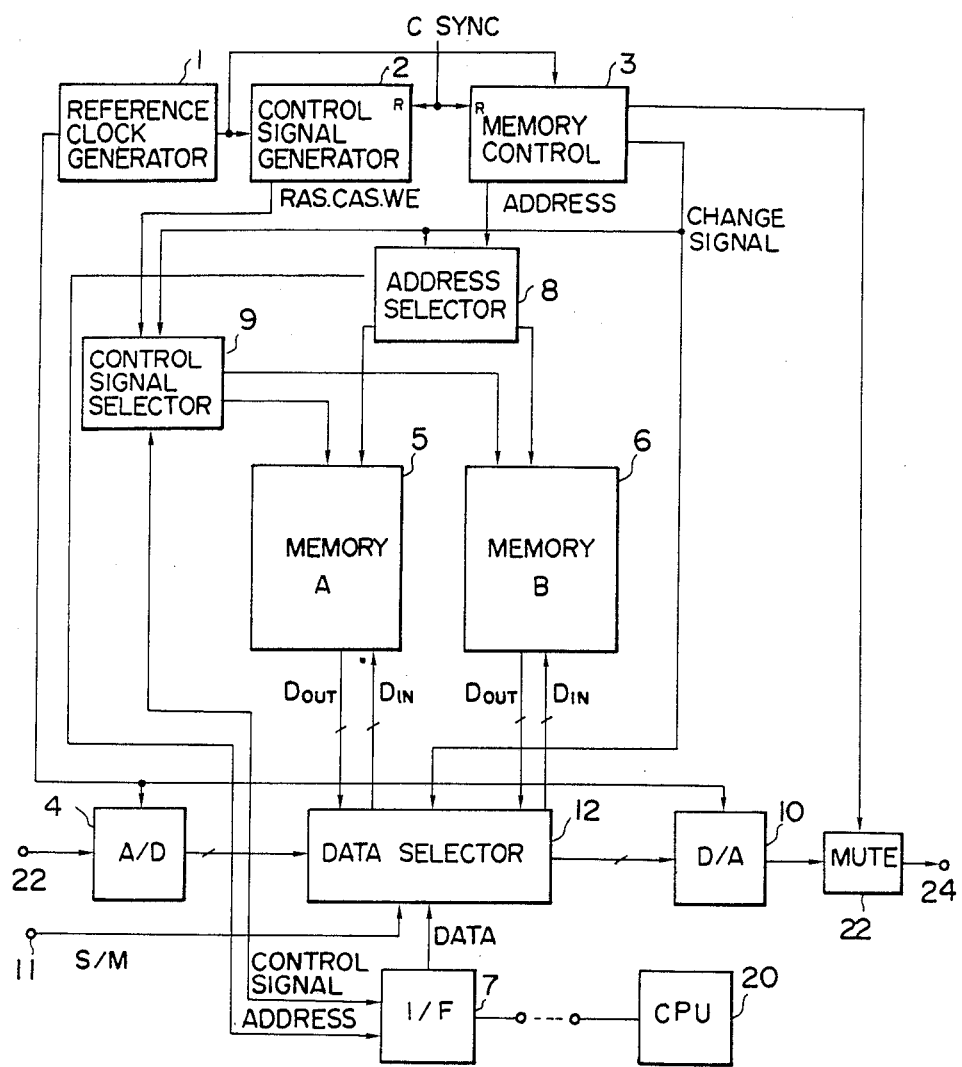
FIG. 1 is a schematic of an image memory apparatus.

FIG. 1 is a block diagram of one embodiment of this invention. In FIG. 1, reference numeral 1 denotes a reference clock generator which generates a reference signal used when image information is written into and read out of a memory at a video rate. The clock frequency is selected to be 12.27 MHz so that the mesh ratio (the ratio of length to width) of a pixel is 1:1. Reference numeral 2 denotes a control signal generator which produces memory control signals (a row address selection signal RAS, a column address selection signal CAS, a write enable signal WE, etc.) on the basis of a clock signal deriving from reference clock generator 1. Reference numeral 3 denotes a memory control which produces an address signal and three selector change signals to be described in more detail later on the basis of a clock signal from clock 1. The elements 2 and 3 are supplied with a composite signal SYNC and reset with signals H and VSYNC. It is to be noted that the composite signal SYNC may be obtained by separation from an input video signal. Reference numeral 4 denotes an l-bit A to D convertor which converts an input video signal to a digital signal. A sample clock signal applied to the convertor is derived from clock generator 1. Reference numerals 5 and 6 denote RAMs which store image data digitized by convertor 4. The capacity of the respective RAMs 5 and 6 corresponds to 256 Kbits×1, namely, pixels of 256 bits long×1024 bits wide×1 bits deep so that a picture of one frame can be stored in a gradation of l bits in the total capacity of memories 5 and 6. Reference numeral 7 denotes an interface (hereinafter referred to as the I/F) with an external CPU 20 and supplies data and an address control signal required for reading out of and writing into the memories 5, 6 from external CPU 20 to three selectors to be described in more detail later. Reference numeral 8 denotes an address selector which distributes addresses from memory control 3 and I/F 7 to memories A and B, respectively, shown by reference numerals 5 and 6, in accordance with a change signal from memory control 3. Reference numeral 9 denotes a control signal selector which distributes control signals from control signal generator 2 and I/F 7 to the memories A and B in accordance with a change signal from memory control 3. Reference numeral 10 denotes a D to A convertor which converts digital image information to analog one at a video rate. A sample clock signal to convertor 10 is supplied by reference clock generator 1. Reference numeral 11 denotes a terminal to which change signals are input during a source and memory reproduction. Reference numeral 12 denotes a data selector which reconnects respective data buses for A/D 4, D/A 10, memories 5 and 6, and I/F 7 in accordance with a source/memory change signal from terminal 11 and a change signal from memory control 3.

For example, at a time of source, digital data from A/D 4 is directly output to D/A 10. In memory reproduction, the data read from memory A, B shown as 5, 6, respectively, are output to D/A 10.

In this case, control is performed so that data is read alternately from memories A and B to D/A 10 at a video rate and at predetermined clock heat interval. Via I/F 7, external CPU 20 may write data into or read data out of that one of the memories A and B which is not being read to D/A 10.

In writing into the memories, control is performed so that digital data from A/D 4 are written alternately into memories A, B, shown as 5, 6, respectively.

Three selectors 8, 9, 12 distribute signals (a control signal from control generator 2, an address signal from memory control 3, an image data signal from A/D 4 or an image data signal to D/A 10), a write signal or a read signal (an address signal, a control signal and a data signal from I/F 7) from external CPU 20 to memories A, B at a video rate in accordance with a change signal from memory control 3. Namely, as described above, reading and writing are performed alternately at the two system memories A and B at video rates. That one of the two system memories not used at this time is opened to I/F 7 so as to permit a dual port operation by writing or reading from external CPU 20.

Reference numeral 20 denotes an external CPU 20, which has access to memories A and B denoted by reference numerals 5 and 6 via I/F 7.

A mute circuit 22 mutes a possible blank portion of a picture produced when the image is changed in length and/or breadth and performs a muting operation in accordance with the output from memory control 3.

In the above arrangement, a time duration in which memories A and B are accessed alternately is such that setting addresses for random access by external CPU 20 via data selector 12 and for the subsequent access at a video rate can be performed.

Figure 2:
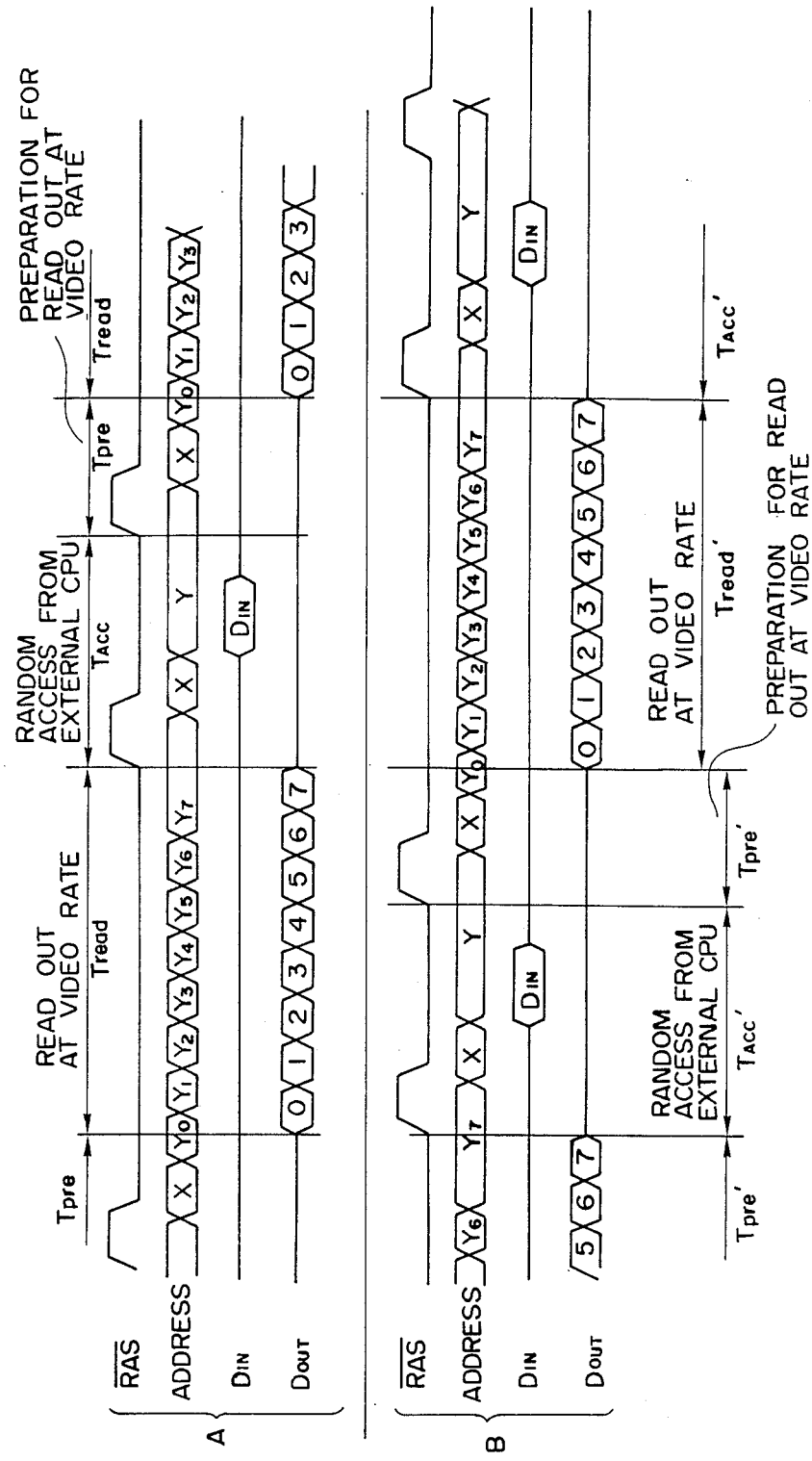
FIG. 2 is a timing chart for allocation of two system memories A and B.

In the this embodiment, as shown in FIG. 2, switching is performed between memories A and B at 8 clock beats in consideration of a time required from a rising edge to a falling edge of a $\overline{RAS}$ signal to be described later, a time required for setting an X address, and a time required for random access from the external CPU. In FIG. 2, reference characters $\overline{RAS}$, address, Din and Dout covered by the group notation A denote signals applied from control signal selector 9, address selector 8, and data selector 12, respectively, to memory A. In FIG. 2, reference characters $\overline{RAS}$, address, Din and Dout covered by the group notation B denote signals applied from control signal selector 9, address selector 8, and data selector 12, respectively, to memory B.

In FIG. 2, $\overline{RAS}$ signal is used for taking, as an X address, data set at an address when the $\overline{RAS}$ signal, once became high, falls subsequently. After once the X address is set, data is sequentially output shown by Dout in accordance with Y addresses set in the address line. This is performed during intervals Tpre, Tread (Tpre', Tread'). The interval shown by Tacc (Tacc') is used for random accessing by external CPU 20 and the interval shown by Tpre (Tpre') is used to prepare for reading out data at a video rate.

Figure 4:
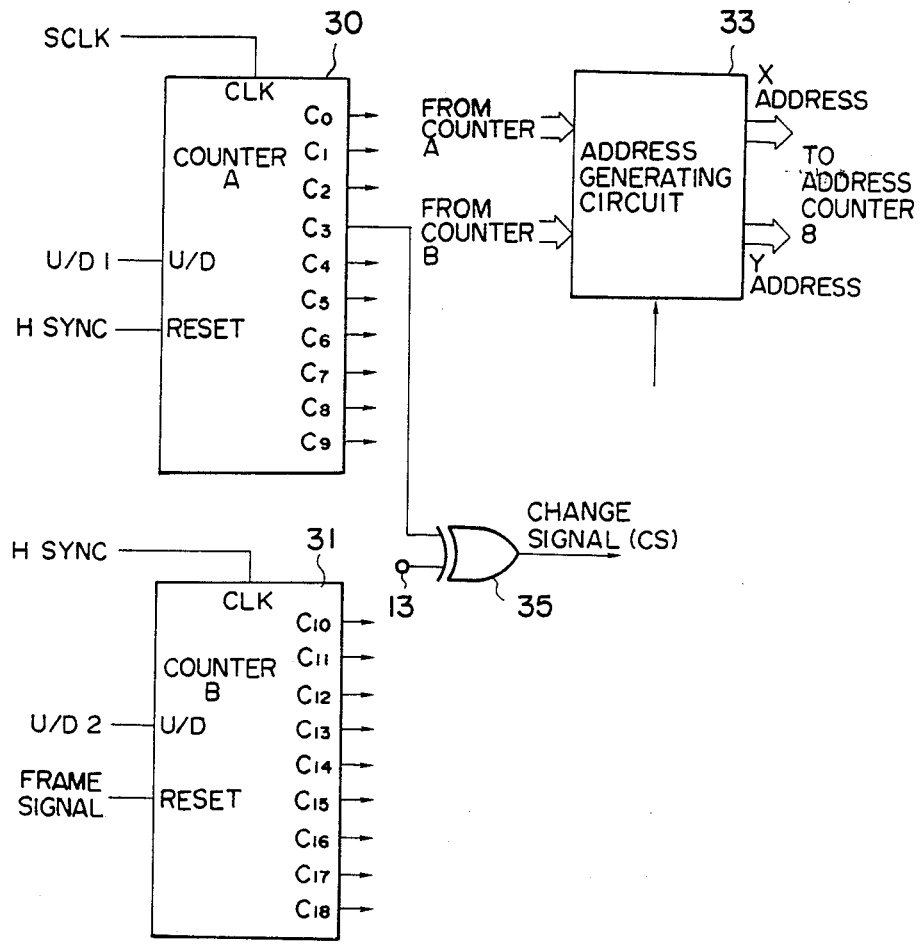
FIG. 4 is a schematic of a counter in a memory control 3 shown in FIG. 1 with associated change signals.

The internal structure of memory control 3 will now be described using FIGS. 4 and 5. FIG. 4 shows the internal structure of memory control 3 and FIG. 5 shows the connection between the respective terminals of counters A and B of the address switching circuit shown in FIG. 4 and the respective addresses of memories A and B.

In FIG. 4, counter A shown by reference numeral 30 is of a 10 bit type which counts pulses of a reference clock signal SCLK from reference clock generator 1. It counts up or down in accordance with a signal U/D 1 input to a U/D terminal and is reset with a signal HSYNC of a signal CSYNC.

Counter B shown by reference numeral 31 is also of a 10 bit type which counts pulses HSYNC. It counts up or down in accordance with a signal U/D 2 input to a terminal U/D and is reset with a frame signal having a period of 2 V.

An address generating circuit 33 converts signals from counters A and B to corresponding addresses in memories A and B. The operation of address generating circuit 33 is shown in FIG. 5.

In FIG. 4, an Exclusive-Or gate 35 has a function of performing an Exclusive-Or operation on a signal from terminal C3 of counter A and a signal from a terminal 13. Normally, terminal 13 receives a signal from a terminal C12 of counter B. It receives a signal from a terminal C13 when the length and/or width of a picture are changed. The Exclusive-Or gate 35 outputs the change signal CS.

Therefore, normally, a change signal CS is inverted at every 8 pixels in the X-direction and at every 4 pixels in the Y-direction to thereby perform a switching between memories A and B. When the length and width of a picture are to be changed, the change signal CS is inverted at every 8 pixels in the X-direction and at every 8 pixels in the Y-direction to thereby perform a switching between memories A and B.

When the length and/or width of a picture are changed and the data is read, terminal 13 is connected to a terminal C13 of counter B shown by 31 and the address lines are connected as shown by the length-width column of FIG. 5.

When the length and/or width of a picture are changed, there are two changes, one being rightward rotation of a picture through 90 degrees and the other being leftward rotation of the picture through 90 degrees. When an address connection is made as shown in FIG. 5 and the picture is rotated clockwise, counter A should count down while the counter B should count up. When the picture is to be rotated counterclockwise, counter B should count down and counter A should count up.

A position on a picture accessed in such a case will now be described with reference to FIGS. 6 and 7.

FIG. 6 shows a change including rotating a picture rightward through 90 degrees while FIG. 7 shows the sequence of accesses performed when the picture is rotated counterclockwise through 90 degrees.

Figure 3:
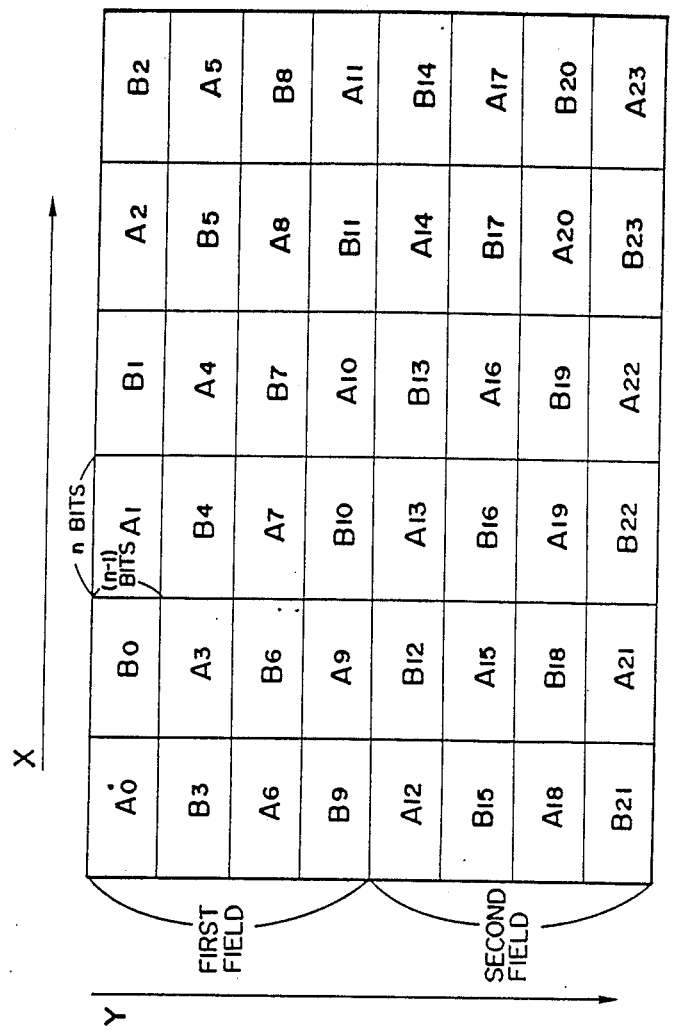
FIG. 3 is a diagram of allocation of two system memories A and B on a picture.

When the picture is to be rotated rightward through 90 degrees, the respective memories are accessed as shown by A2, A1, A6 and A5 in FIG. 6. A3, A4, A7, A8, etc., will be described later). Information for each field is sequentially written into the memories in accordance with change signal CS as shown in FIG. 3. (For the purpose of easy understanding, FIG. 3 shows a case in which n=7, namely, memories A and B are switched therebetween at every $2^7$ pixels in the X-direction and at every $2^6$ pixels in the Y-direction. Actually, as described above, this particular embodiment employs an allocation n=3, namely, a memory configuration in which the memories are switched therebetween at every 8 pixels in the X-direction and at 4 pixels in the Y-direction.) In such a case, by rotation of a picture, image data is read alternately so that one pixel is read from a memory location A2 and then another pixel is read from a memory location A1, and so on. To this end, as shown in FIG. 5, signals from terminals $C_0$–$C_8$ of counter A are output as a Y address and signals from terminals $C10$–$C18$ are output as an X address when the length and/or width of a picture are changed in contrast with the normal manner used, and image data is then read alternately so that one pixel is read from a memory location A2 and then another pixel is read from a memory location A1, and so on. To this end, when in the length and/or width of a picture are changed, the signal from terminal C0 is used as the ninth bit Y8 of the Y address and signals from terminals C1–C8 are used as the first-eighth bits Y0–Y7 of the Y address.

For the interlace scanning, information is read in the sequence of A2, A1, A6 and A5 in the first field and in the sequence of A4, A3, A8 and A7 in the second field.

Thus, when the length and/or width of a picture is changed, the signal from terminal C18 is used as the first bit X0 of the X address and signals from terminals C10–C17 are used as the second-ninth bits X1–X8 of the X address.

Figure 8:
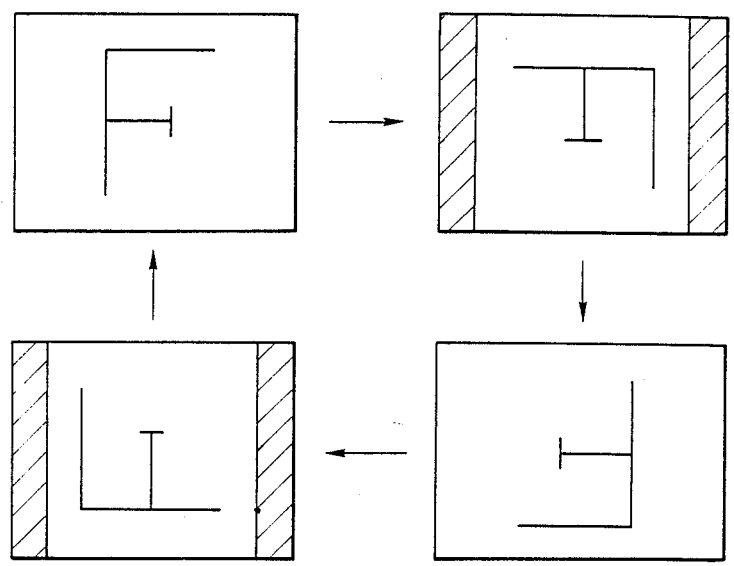
FIG. 8 is a plan view of an image reproduced onto a monitor when the length and/or width of a picture are changed.

The signal from terminal C9 is used as a signal to mute the picture. When the length and width of an image are changed as shown in FIG. 8, part of the picture will be lost to thereby cause a blank portion shown crosshatched. If no measures are taken, the image would appear repeatedly in such blank portion to thereby provide an ugly image. However, according to the particular embodiment, the signal from terminal C9 is used for muting purposes, so that any such blank portions are muted to thereby provide no ugly image.

While a 90 degree clockwise rotation of a picture is performed as described above, a 90 degree counterclockwise rotation of the picture requires for counter B to count down and for counter A to count up, which results in sequential access as shown by b1–b6 in FIG. 7 to display an image rotated counterclockwise through 90 degrees on the monitor.

In the above embodiment, an image having a ratio of length to width of 3:4 is rotated by 90 degrees as it is, so that part of the image will be lost in the length and/or width of the image are changed. In order to prevent such loss, a second embodiment is directed to a method of thinning out pixels into one half in length and width when the length and/or breadth of the image are changed.

Such embodiment must also be able to be used as a dual port when the length and/or width of the image are changed as in the first embodiment. Namely, when data is read by changing the length and/or breadth of the image, the memories A and B of the two systems must be switched at n-bit intervals.

In the particular embodiment, the allocations of memories A and B, shown by reference numerals 5 and 6, respectively, each include squares of n×n bits, as shown in FIG. 9.

In this memory allocations, one of two fields constituting one frame is only required to be selected in order to thin out the longitudinal allocations into one half when the length and/or width of the image are changed as shown in FIG. 8. In order to thin out the horizontal memory allocations to one half, signals from terminals C10–C17 of counter B shown in FIG. 4 are only required to be used as the third-tenth bits X2–X9 of the X-direction address.

In order to select one of the two fields, the two most significant bits, namely, the ninth bit Y8 and the tenth bit Y9 in the Y-direction address should not be used.

In this case, X0, Y8 are fixed to "1" or "0" and the OR combination of signals from terminals C9 and C8 are used as a signal for muting purposes.

According to the above embodiment, pixels are thinned out into one half when the length and/or breadth of the image are changed, so that loss of any part of the image will be prevented.

In the above embodiment of FIG. 5, the signal from terminal C9 is used for muting purposes while in the embodiment in which allocation of memories A and B is performed as shown in FIG. 8, a signal including the OR combination of signals from terminals C9 and C8 is used for muting purposes, so that when the length and/or breadth of the image are changed the image whose length and/or breadth are changed does not appear in the central portion of monitor and is displayed shifted toward one side of the monitor.

An embodiment in which the image whose lengthbreadth are changed will appear in the central portion of the monitor will now be described. In the particular embodiment, counters A and B, shown by 30 and 31, respectively, each include a presetable counter whose preset value is set to an appropriate one so that an image will appear in the central portion of the monitor when the length and/or breadth of the image are changed.

Pixels of each of the memories A, B, as shown by 5 and 6, is 1024×512 bits. In fact, that portion of the monitor which can accommodate a reproduced picture (image data) corresponds to 780×512 bits. Since that portion of the monitor which accommodates the picture (image data) also contains a blanking portion, so that the position when the length and/or width of the image are changed will be considered on the assumption that a picture (image data) is accommodated in 768×512 bits.

First, consider the horizontal picture portion. The horizontal pixels reproduceable on the monitor when the image is rotated clockwise or counterclockwise through 90 degrees are 768 bits whereas the memory has only 512 bits of vertical pixel data, and the difference (the horizontal blank portion produced on the monitor when the image is rotated through 90 degrees) is 256 bits. If 639 is preset at counter A in accordance with resetting by HSNC when the image is rotated clockwise through 90 degrees, and the counter is operated so as to count down by the signal from terminal U-D, the signal from the terminal C9 will be high so that the first 128 clock beats are muted and the display of the image starts with the $128^{th}$ bit from the left end of the monitor screen.

The count of counter A becomes 0 at the 640th bit from the left end of the screen. The count of counter A is 1023 at the position of 641th bit, and the signal from terminal C9 becomes high, at which time the screen becomes mute again, counter A is again preset in accordance with the next HSYNC and operated similarly.

When the image is rotated counterclockwise through 90 degrees, counter A is counting up. Thus if the counter A is preset to 895 (1023-256/2) in accordance with HSYNC, the signal from terminal C9 becomes high during the first 128 dots, so that the screen is muted, and the count of counter A becomes "1" at the 129th dot from the left end of the screen and the signal from terminal C9 is inverted to start a picture. The counter becomes 512 at the 641th dot from the left end of the screen and the signal from terminal C9 becomes high, so that the following picture portion becomes muted.

For the vertical portion of the screen, counter B is caused to count up from 0 to 511 when the image is rotated clockwise through 90 degrees as shown before while counter B is caused to count down from 511 to 0 when the image is rotated counterclockwise through 90 degrees.

According to this particular embodiment, even when the length and/or width of an image are changed, a display is performed at all times on the central portion of the screen, and the blank portion is muted so as not to be ugly, so that the display becomes easy to watch.

Figure 11:
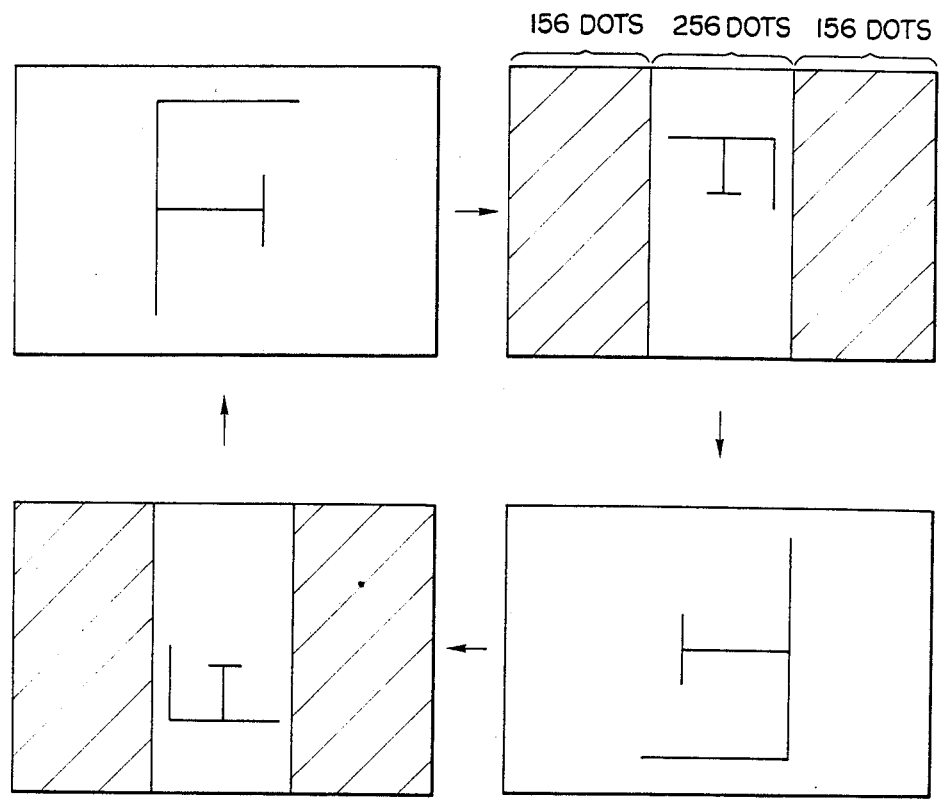
FIG. 11 shows an image reproduced onto a monitor when the length and/or width of the picture are changed in the diagram of memory allocation shown in FIG. 9.

When both the length and breadth of an image are reduced to one half, a mute portion for 156 dots is formed on each of the sides of the picture as shown in FIG. 11 because horizontal image data should be reduced to one half and is only 256 dots (=512×½ dots) although the horizontal portion of the screen has 768 dots. Therefore, where the image is to be rotated clockwise through 90 degrees, if counter A which is reset in accordance with HSYNC when the image is rotated clockwise through 90 degrees is preset to 511 and caused to count down, reproduction of image data starts with the 257th position from the left end of the screen since the signal including the OR combination of signals from terminals C8 and C9 is used for muting purposes. The count of the counter becomes from 0 to 1023 at 513th position from the left end of the screen, so that the following portions of the picture are again muted thereafter. 1024-dot data of the vertical picture is thinned out to 512 dots data, so that the counter is caused to count up from 0 to 511 in the case of the clockwise 90 degree rotation of the image, and is caused to count down from 511 to 0 in the case of the counterclockwise 90 degree rotation.

According to the particular embodiment, although the length of the image are changed in a one-half reduction mode or as it is, display is performed at the central portion of the screen as shown in FIGS. 11 and 8, and any blank portion is muted so that the display becomes easy to watch.

As described above, according to this invention, the image memory apparatus has a dual port function and is capable of changing the vertical and horizontal positions of an image only by changing the counters and address lines.

We claim:

1. An image memory apparatus comprising:
   (a) a two-dimensional memory comprising first and second memory means; and
   (b) first control means for accessing said two-dimensional memory in such manner that said first control means accesses:
   said first memory means when $(X_m, Y_n) = (0, 0)$;
   said second memory means when $(X_m, Y_n) = (1, 0)$;
   said second memory means when $(X_m, Y_n) = (0, 1)$; and
   said first memory means when $(X_m, Y_n) = (1, 1)$, wherein $X_m$ and $Y_n$ are the $m^{th}$ and $n^{th}$ bits of addresses X and Y, respecitvely, of image information.

2. An image memory apparatus according to claim 1, further comprising:
   (c) second control means for accessing said two-dimensional memory in such manner that said second control means accesses one of said first and second memory means is not accessed by said first control means.

3. An image memory apparatus according to claim 1, wherein said image memory is adapted to be connected to an external device and said second control means includes an interface circuit to the external device.

4. An image memory apparatus according to claim 1, further comprising:
   (d) means for writing into and reading out of said two-dimensional memory.

5. A method of accessing an image memory apparatus comprising first and second memory means, said method comprising the steps of:
   accessing the first memory means when $(X_m, Y_n) = (0, 0)$;
   accessing the second memory means when $(X_m, Y_n) = (1, 0)$;
   accessing the second memory means when $(X_m, Y_n) = (0, 1)$; and
   accessing the first memory means when $(X_m, Y_n) = (1, 1)$, wherein $X_m$ and $Y_n$ are the $m^{th}$ and $n^{th}$ bits of addresses X and Y, respectively, of image information.

6. A method according to claim 5, further comprising the step of of writing image information into the first and second memory means.

7. A method according to claim 5, wherein said first and second memory means have a first data port and a second data port.

8. An image memory apparatus for processing image information of a first image having a predetermined length and width, said image memory apparatus comprising:
   (a) a two-dimensional memory for writing the image information thereinto in a first sequence and reading the image information therefrom in a second sequence, wherein said two-dimensional memory is oblong;
   (b) means for rotating the first image written into said two-dimensional memory by causing the first sequence and the second sequence to differ from each other, resulting in blank portions in the rotated image if the length and width of the first image are different; and
   (c) means for muting the blank portions.

9. An image memory apparatus according to claim 8, wherein said rotating means includes means for rotating the first image written into said two-dimensional memory through 90 degrees.

10. An image memory apparatus according to claim 8, wherein said rotating means includes:

(a) means for writing image information into said two-dimensional memory; and
(b) means for reading the image information from said two-dimensional memory;
wherein the first sequence differs from the second sequence.

11. An image memory apparatus according to claim 10, wherein said writing means includes a data selector for determining whether an input signal corresponding to first the image to be written should be supplied to said two-dimensional memory or to an external device without supplying the input signal to said two-dimensional memory.

12. An image memory apparatus according to claim 9, wherein said rotating means further includes means for rotating the first image written into said two-dimensional memory, clockwise or counterclockwise through 90 degrees.

13. An image memory apparatus according to claim 8, wherein said two-dimensional memory has an address of $M \times N$ bits wherein M and N are integers and M and N are not equal to each other.

* * * * *

UNITED STATES PATENT AND TRADEMARK OFFICE
CERTIFICATE OF CORRECTION

PATENT NO. : 4,912,771
DATED : March 27, 1990
INVENTOR(S) : TAKAYUKI KOMINE, ET AL.

It is certified that error appears in the above-identified patent and that said Letters Patent is hereby corrected as shown below:

COLUMN 1

Line 63, "company" should read --accompanying--.

COLUMN 8

Line 10, "respecitvely," should read --respectively,--.
    Line 16, "and" should read --and said--.
    Line 17, "means is" should read --means when said one of said first and second memory means is--.
    Line 42, "of" (second occurrence) should be deleted.

COLUMN 9

Line 4, "memory;" should read --memory,--.
    Line 11, "first the" should read --the first--.

Signed and Sealed this

Fifteenth Day of December, 1992

Attest:

DOUGLAS B. COMER

Attesting Officer      Acting Commissioner of Patents and Trademarks